(12) United States Patent
Jeffers et al.

(10) Patent No.: US 9,043,161 B2
(45) Date of Patent: May 26, 2015

(54) MODULAR SYSTEM AND METHODOLOGY FOR TESTING AND MEASUREMENT

(75) Inventors: Edward Jeffers, Miami, FL (US); Jose Sacerio, Hialeah, FL (US)

(73) Assignee: CPS Products, Inc., Hialeah, FL (US)

( * ) Notice: Subject to any disclaimer, the term of this patent is extended or adjusted under 35 U.S.C. 154(b) by 524 days.

(21) Appl. No.: 13/462,040

(22) Filed: May 2, 2012

(65) Prior Publication Data

US 2013/0297225 A1 Nov. 7, 2013

(51) Int. Cl.
- *G06F 19/00* (2011.01)
- *G01C 25/00* (2006.01)
- *G05B 19/042* (2006.01)
- *H04L 29/08* (2006.01)

(52) U.S. Cl.
CPC .............. *G05B 19/042* (2013.01); *H04L 67/12* (2013.01)

(58) Field of Classification Search
CPC ... G01N 33/007; G01N 33/497; G01N 27/26; G01N 27/304; G01N 33/0006; G01N 35/00693; H04L 67/12; H04L 12/26; A61B 5/00; G05B 19/042
USPC .............. 702/22, 30, 32, 116; 73/1.06, 53.01, 73/866.5, 23.02; 205/785.5; 324/71.1, 324/115; 600/365
See application file for complete search history.

(56) References Cited

U.S. PATENT DOCUMENTS

| | | | |
|---|---|---|---|
| 4,608,532 A | 8/1986 | Ibar et al. | |
| 5,162,725 A | 11/1992 | Hodson et al. | |
| 5,821,405 A | 10/1998 | Dickey et al. | |
| 6,285,912 B1 | 9/2001 | Ellison et al. | |
| 6,422,061 B1 | 7/2002 | Sunshine et al. | |
| 6,655,223 B2 | 12/2003 | March et al. | |
| 6,658,915 B2 | 12/2003 | Sunshine et al. | |
| 7,339,367 B2 | 3/2008 | Heisler et al. | |
| 2006/0250276 A1 | 11/2006 | Levinson | |
| 2010/0160785 A1 | 6/2010 | Poland et al. | |
| 2010/0213080 A1 | 8/2010 | Celentano et al. | |
| 2010/0298684 A1 | 11/2010 | Leach et al. | |
| 2011/0306931 A1 | 12/2011 | Kamen et al. | |

FOREIGN PATENT DOCUMENTS

| | | |
|---|---|---|
| DE | 19547281 A1 | 7/1996 |
| EP | 834848 | 4/1998 |
| GB | 2348010 A | 9/2000 |

*Primary Examiner* — John H Le

(74) *Attorney, Agent, or Firm* — Malin Haley DiMaggio & Bowen, P.A.

(57) ABSTRACT

A modular system and method for testing and measuring various physical and chemical properties of substances includes a user interface unit having a micro controller, a power source, a display, and an input device; and a sensing module having a sensor probe, a signal conditioner, and a sensor controller. The user interface unit and the sensing modules are in electrical communication with one another such that sensor data generated by the one or more sensor probes, corresponding to one or more properties of the substances, is transmitted to the micro controller of the user interface unit. The user interface unit can be used to remotely view, test, record, and analyze data obtained by the sensing module, which module may be located at a remote location. The user interface unit and the sensing module may be in wired or wireless communication according to various known wired and wireless connection means.

20 Claims, 3 Drawing Sheets

MODULAR SYSTEM AND METHODOLOGY FOR TESTING AND MEASUREMENT

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to a system and method concerning a modular approach to testing and measurement of the characteristics of various gases, liquids, and solids.

2. Description of Related Art

Presently there exists a wide variety of methods and means for testing for the existence and various physical characteristics of gases, liquids, and vapors. Typically, a single purpose instrument is provided which can receive a sample or a particle gas or liquid to determine a particular physical characteristic thereof, such as temperature, pressure, relative humidity, degrees of superheat, concentration, and the like. With the advent of digital technology, and specifically digital signal processing (DSP), testing and examination of characteristics of various substances has become exponentially simpler and more accurate. Often, all that is needed is a simple transducer connected to a microprocessor or other central processing unit. The transducer comes into direct or indirect contact with the substance to be measured, which transducer then sends a signal to the microprocessor. The specific characteristics can be sent from the microprocessor to a display or another computing device for observation and analysis. With the increasing power and complexity of transducers, sensors, and computing devices, several attempts have been made at providing an improved and more robust means and methodology for testing and measuring various chemicals and substances. Many of these devices include means and methodology for controlling the transducers and/or sensors, but have significant shortcomings.

For example, U.S. Pat. No. 7,339,367 relates to an interface for detection and control of multiple test probes. This device includes an interface module with a probe detection module configured for connection and communication with an identification bus. There is also a control and data module configured for connection to the bus, with multiple connectors. Multiple test probes are used with the system. This system is primarily used to measure the quality of cellular networks, for example data and voice messages. While providing for digital control of certain measurement devices, this invention fails to provide for real-time measurement of the chemical characteristics of substances, such as liquids, gases, and the like.

U.S. Pat. No. 6,655,223 relates to a modular measuring system which includes a plurality of connection modules for sensors located within housings, along with an electronic module for input and output that is controlled by an identification code. This system is used primarily with respect to monitoring sewage treatment plants and various related physical and chemical properties. While providing a means to measure certain chemical and physical properties, the device is disadvantageous because measurement of such properties cannot take place remotely. Rather, here, the sensors are fixed to the location of measurement and the control module most be proximal thereto. Furthermore, the modules are not capable of controlling external devices such as solenoids and relays.

U.S. Pat. No. 5,821,405 describes a modular water quality apparatus and measurement methods which include a sealed or unsealed housing with a universal sensor interface cap. There are mechanical and electrical sensor connections which are connected to a programmable motherboard. A particular software control and hierarchy scheme is also illustrated. In its basic form, the invention is a universal socket which can accommodate a plurality of sensors and processing modules. The invention fails to provide for actuation of solenoids or relays, nor does it provide a for a readout display of detected chemical and physical properties.

Finally, U.S. Pat. No. 5,162,725 illustrates a modular metering device which includes multiple sensing probes. The unit includes inputs for separate sensors along with a central processor, LED display, keypad and support circuitry. Here, the sensors transmits analog data to the central processor whereby the processor then conditions and digitizes the analog data in order to output the results on a display or send across to another device. Because analog signals must be transmitted to the central processor, the invention is not suitable for wireless transmission and/or transmission to a substantially remote location, due to signal degradation and/or interference across long cable lengths or inferior analog communications means.

Accordingly, there is a need in the art for an enhanced and more robust system and method for testing and measuring the various physical and chemical properties of substances which allows for remote placement of sensors which can transmit physical and chemical property data to a central hub device or user interface unit for display, recordation, and analysis.

It is, therefore, to the effective resolution of the aforementioned problems and shortcomings of the prior art that the present invention is directed. However, in view of the testing and measurement means and methodology in existence at the time of the present invention, it was not obvious to those persons of ordinary skill in the pertinent art as to how the identified needs could be fulfilled in an advantageous manner.

SUMMARY OF THE INVENTION

The present invention provides a modular system and method for testing and measuring various physical and chemical properties of substances. In some embodiments, the system comprises a user interface unit having a micro controller, a power source, a display, and an input device; one or more sensing modules each having at least one sensor probe, a signal conditioner, and a sensor controller. The user interface unit and the sensing modules are in electrical communication with one another such that sensor data generated by the one or more sensor probes, corresponding to one or more properties of the substances, is transmitted to the micro controller of the user interface unit. Accordingly, the user interface unit can be used to remotely view, test, record, and analyze data obtained by the sensing module, which module may be located at a remote location. The user interface unit and the sensing module may be in wired or wireless communication according to various known wired and wireless connection means.

The micro controller of the user interface unit is in electrical communication with the display and the input device and in some cases, the display and input device are coextensive, such as a in a touch-screen display. The sensor probe of the sensing module is in electrical communication with the signal conditioner and the signal conditioner is in electrical communication with the sensor controller. Accordingly, sensor data generated by said one or more sensor probes is digitized and/or processed by the signal conditioner and passed through to the sensor controller whereby the sensor controller sends the digitized sensor data (i.e. signal data) to the micro controller in a computer-readable format. Accordingly, the micro controller then displays the digital sensor data on the display. Further, the sensor data can be retrieved from the micro controller for recordation and analysis. Additionally, instructions can be sent from the micro controller to the sensor controller wherein the instructions are capable of manipulating the sensor probe. This allows the user to manipulate the testing and measurement parameters remotely from the user interface unit. Further still, micro controller is capable of sending instructions to the sensor controller which can actuate a solenoid, relay, or valve that may be in communication with the at least one sensor probe.

In other embodiments, a hub may be provided such that the system comprises a user interface unit having a micro controller, a power source, a display, and an input device; a hub having a hub controller, a voltage regulator, and an auxiliary power supply; and one or more sensing modules each having at least one sensor probe, a signal conditioner, and a sensor controller. In this embodiment, the sensing modules are in electrical communication with the hub controller of the hub and the hub controller is in electrical communication with the micro controller of the user interface unit such that sensor data generated by the one or more sensor probes corresponding to one or more properties of the substances is transmitted to the micro controller of the user interface unit through the hub controller.

Accordingly, the present invention also contemplates a method and modular approach to testing and measurement of chemical and physical properties of substances, comprising: providing a sensing module having at least one sensor probe, a signal conditioner, and a sensor controller, wherein the sensor probe is in electrical communication with the signal conditioner and the signal conditioner is in electrical communication with the sensor controller; establishing electrical communication, either wired or wirelessly, between the sensor controller of the sensing module and a micro controller of a user interface unit; generating, by said sensor probe, sensor data corresponding to one or more properties of the one or more substances; converting, by the signal conditioner, the sensor data into computer-readable signal data; and transmitting, the computer-readable signal data to the micro controller from the sensor controller. Further, the signal data may be displayed on a display in electrical communication with the micro controller of the user interface unit. Instructions may be transmitted to the sensor controller from the micro controller, wherein the instructions are capable of actuating a solenoid, relay, or valve at the sensor probe.

Accordingly, it is an object of the present invention to provide a modular system and associated method for testing and measuring various physical and chemical properties of substances.

It is another object of the present invention to provide a system that enables the user with to place sensors in desired locations and receive sensor data on a user interface unit that is either proximal or remote from the sensors.

It is yet another object of the present system to provide the user with a means for employing a plurality of sensing modules all of which can transmit signal and sensor data to a single user interface unit, allowing for the capture, analysis, and testing of a plurality of substances in a plurality of locations from a single device.

It is still another object of the present invention to provide a system that allows the user to employ certain sensing modules that include actuators such that the user can active the actuators from the user interface unit without the need to physically interact with the sensing module.

In accordance with these and other objects which will become apparent hereinafter, the instant invention will now be described with particular reference to the accompanying drawings.

DETAILED DESCRIPTION

Figure 1:
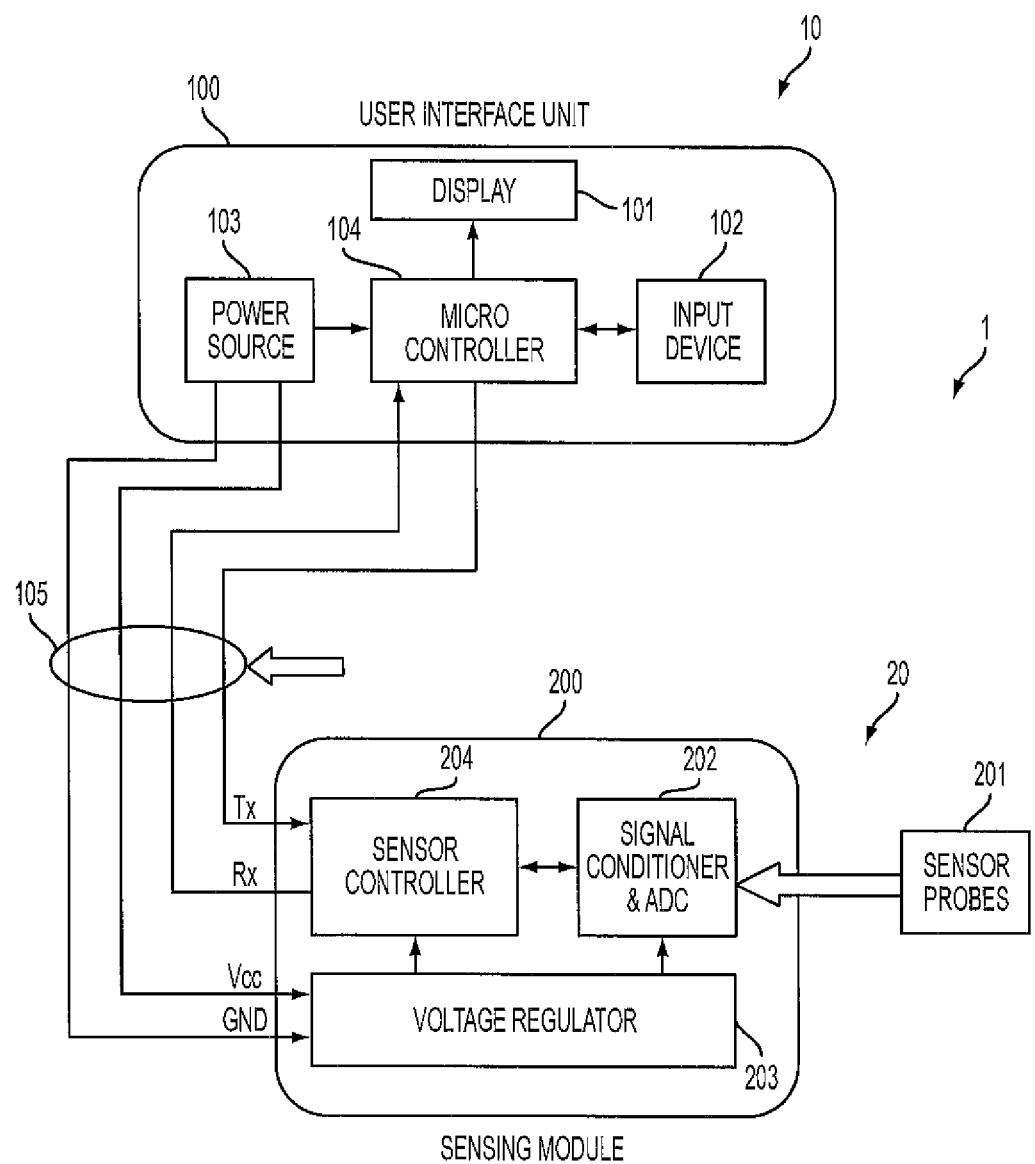
FIG. 1 is a schematic of one embodiment of the system of the present invention.

With reference to FIGS. 1-3, the present invention contemplates a modular testing and measurement system and various methodology related thereto. In some embodiments, the modular testing and measurement system comprises two primary components: a user interface unit 10 and at least one sensing module 20 wherein the user interface unit 10 and sensing modules 20 are configured to communicate with one another. Communication between the user interface unit 10 and various sensing modules 20 may be accomplished over a wired connection or a wireless connection. A wireless connection is particularly useful because it eliminates the need for the user interface unit 10 to be physically near the sensing modules 20. Indeed, the present invention contemplates a remote user interface unit 10 which can remotely collect data from the various sensing modules 20 for testing, measurement, recordation, and analysis.

In some embodiments, the user interface unit 10 generally incorporates, in a common housing 100, a display 101 such as an LCD panel or an OLED panel, an input device 102 such as a keypad or touch-screen, a power source 103 which may be in the form of a battery if the unit is portable, a micro controller 104, and connecting means 105, such as an interconnect cable, to interface with the sensing module 20. In other embodiments, the connecting means 105 may comprise a wireless transmitter/receiver which interfaces with a wireless transmitter/receiver on a sensing module, as discussed in further detail below. Power source 103 provides electrical power to controller 104 which in turn can power the input device 102. In some embodiments, controller 104 comprises computing device containing a chipset, memory, and software or logic. Controller 104 is further in electrical communication with display 101.

Referring generally to the user interface unit 10 of the present invention, display 101 may comprise any known display types such as LCD (liquid crystal display), LED (light emitting diode), CRT, and the like. In some embodiments, an LCD is preferred due to its low power consumption, high-contrast, and relatively low cost. In some embodiments, the LCD display 101 may comprise a plurality of segmented LCD panels, or a single LCD panel of desired size. The LCD display may be integrated as a touch-panel or touch screen device such that the display 101 and input device 102 are coextensive. Touch-panel displays are particularly useful in user interface unit 10 because it reduces the overall footprint and eliminates the need for an external input device 102 such as a keyboard, mouse or combination thereof, although such external input devices 102 may be useful and thus are contemplated by the present invention. As shown in the figures, display data is generated by the controller 104 which sends the appropriate signals to the display 101, such as for example, read out information obtained from the sensor modules 20. Information is exchanged between the controller 104 and the display 101 over typical I/O ports such as a serial peripheral interface (SPI) bus.

The user interface unit 10 is adapted to be in electrical communication with one or more sensing modules 20. Accordingly, in some embodiments, an exemplary sensing module 20 incorporates, also in a common housing 200, one or more sensor probes 201 such as thermistors, thermocouples, pressure or weight sensors, air velocity or vacuum sensors. The sensor probes 201 can be all of the same type or in meaningful combinations such as a pair of temperature sensors and a pair of pressure sensors to allow the simultaneous measurement of superheat and sub-cooling. The sensors can be removable like temperature probes or fixed, for example, like weight sensors. The sensing module 20 can also incorporate an actuator such as in the case of a weight sensor which also has a solenoid valve to control the charging or recovery of refrigerant. The sensing module 20 component of the modular test and measurement instrument herein contains all the elements necessary to take a measurement of a physical or chemical property of a substance, and send that information onto the user interface unit 10. Additionally, the sensing module can also activate an electromechanical actuator such as a solenoid valve, a motor driven ball valve or even a simple relay. The inclusion of a sensor and an actuator in the same sensing module can provide a powerful set of functions such as the automatic charge or recovery of refrigerant by weight or by superheat.

In some embodiments, sensing module 20 also includes a signal conditioner 202 in electrical communication with the one or more sensor probes 201. In some embodiments, the signal conditioner 202 functions as an analog-to-digital converter and/or a digital signal processing unit. Also provided are a voltage regulator 203 and a sensor controller 204. As shown, voltage regulator 203 provides power to both the sensor controller 204 and the signal conditioner 202. The sensor controller 204 is in electrical communication with the signal conditioner 202 such that analog signals sent from the sensor probes 201 to the signal conditioner 202 can be passed through from the conditioner 202 to the sensor controller 204 for further processing and transmission back to the user interface unit 10. Accordingly, sensor controller 204 may comprise a computing device having a chipset, memory, and software or built-in logic. Because the sensing modules 20 are integrated with the signal conditioner 202 and sensor controller 204, the sensing module 20 can independently handle all of the sensing and conversion duties and simply send the results back to the user interface unit 10 digitally, in a computer-readable format. This feature is particularly useful because it assures the integrity of the data as it is being sent back to the interface unit 10, as well as speeds up the sensing and data collection process. Moreover, it allows the sensing modules 20 to be placed remotely from the user interface unit 10, which improves safety and overall convenience.

As shown in FIG. 1, the user interface unit 10 may be electrically coupled to the sensing module 20 by connecting means 105. In some embodiments, connection means 105 comprises a 4-wire interconnect cable having at least two signal wires Tx and Rx, a power wire Vcc, and a ground wire GND. Accordingly, power source 103 may provide power to voltage regulator 203 over power wire Vcc wherein voltage regulator 203 then relays power to sensor controller 204 and signal conditioner 202. Simultaneously, power source 103 provides power to micro controller 104 of user interface unit 10, which in turn powers display 101 and input device 102. Further, data signals are relayed between user interface unit 10 and sensing module 20 over signal wires Tx and Rx. In some embodiments, signal wire Tx is a "transmission" or "to" signal wire, wherein data is sent from controller 104 of user interface unit 10 to sensor controller 204 of sensor module 20. Similarly, signal wire Rx is a "receive" or "from" signal wire, wherein data is received by controller 104 of user interface unit 10 from sensor controller 204 of sensing module 20. In alternative embodiments, a single signal wire may be provided, which permits bi-directional communication between the user interface unit 10 and sensing module 20. In accordance with the foregoing, sensor data generated by sensor probes 201 is transmitted to the user interface unit 10 over wire Rx by way of the signal conditioner 202 and sensor controller 204. Instructions can be sent from the user interface unit 10 along wire Tx to the sensing module 20. Instructions may include, for example, instructions to start testing and end testing, as well as alter testing parameters. Further, instructions may include instructions to activate a solenoid, relay, valve, or the like which may be located proximal to or engaged with the sensor probes 201.

With respect to wired connecting means 105, a variety of physical connections and corresponding communications protocols may be used. In some embodiments, a serial connection is preferred because it reduces the number of wires needed and generally provides the desired performance. By way of non-limiting example, the wired connecting means may comprise SPI or Microwire, I2C, USB, and EIA RS232. SPI or Microwire protocol is supported by most modern controllers used in sensors known in the art, is fast and robust, but requires 4 wires for full implementation. I2C is also supported by most modern controllers and only requires 2 wires, but is not as robust as other connections/protocols. USB, or universal serial bus, is relatively complex but is quite robust even though it may only utilized 2 wires. Finally, EIA RS232 protocol is supported by most controllers, it requires only two wires, is relatively fast and robust, and is very well supported by existing software and chipset logic. It is of course appreciated that other configurations and protocols of signal wires may be equally useful. In some embodiments, the EIA RS232 specification requires a minimum voltage level greater than 3.0 VDC. For example, in some cases, the signal level of the signal wire Rx/Tx pair will be maintained at +/−5.0 VDC so the user interface 10 and the sensing modules 20 can also connect directly to an external personal computer.

Further still, as noted above, connecting means 105 may be provided wirelessly, for example over a wireless interne connection, infrared (IR), or radio frequency (RF) means. Accordingly, micro and sensor controllers 104 and 204 of unit 10 and sensing module 20, respectively, may each include a wireless transmitter/receiver whereby data signals may be interchanged between the two. In a wireless configuration, it is desirable for unit 10 and sensing module 20 to each have independent power supplies and, accordingly, a stand-alone power supply may be exchanged for the voltage regulator 203 of the sensing module 20, which power supply includes the power wire Vcc and ground wire GND. The particular wireless protocol implemented (i.e, Wifi, IR, RF) need not be construed as limiting as there are many known wireless communication protocols that are suitable provided such protocols provide ample bandwidth and fidelity for transmission of data signals between the user interface unit 10 and the sensor modules 20.

Figure 2A:
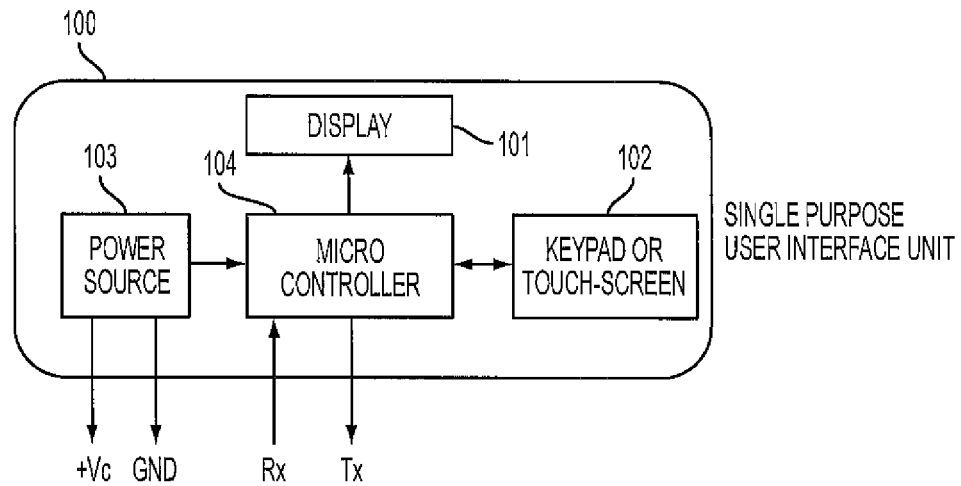
FIGS. 2A and 2B are schematics of two embodiments of the user interface units of the present invention.
Figure 2B:
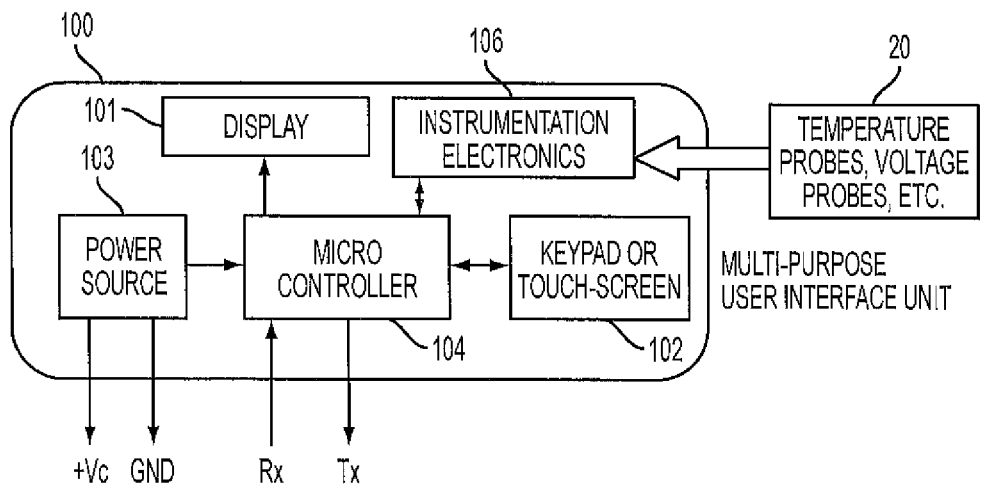

With reference to FIGS. 2A and 2B, shown are two exemplary embodiments of the user interface unit 10 of the present invention. Shown in FIG. 2A is single purpose user interface unit 10 consisting of a display 101, input device 102 such as keypad or touch screen, power source 103, controller 104 and connecting means 105 (FIG. 1) which connects the user interface unit 10 to the one or more sensing modules for the purpose of gathering and displaying information collected by those sensing modules. In other embodiments, a multi-purpose user interface unit 10 is provided, which has a built-in instrument 106 such as a thermometer or voltmeter wherein the unit 10 can function as a standalone instrument but also has connecting means 105 in order to interface with one or more external sensing modules 20. Although both types have merit, the single purpose user interface unit (FIG. 2A) is more flexible and less costly since the user can choose which sensor modules 20 he would like to use without needing the built-in instrument 106 of the multi-purpose unit 10. Furthermore, as noted above, the external sensing modules 20 are desirable because they can be located remotely from the user interface unit 20, can carry out signal processing on-board, and improve safety and convenience.

Figure 3A:
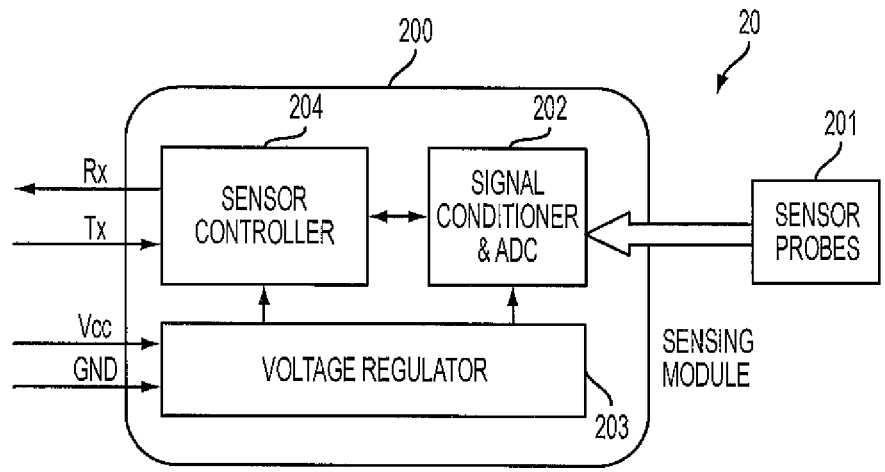
FIGS. 3A and 3B are schematics of embodiments of the sensing module and hub of the present invention.
Figure 3B:
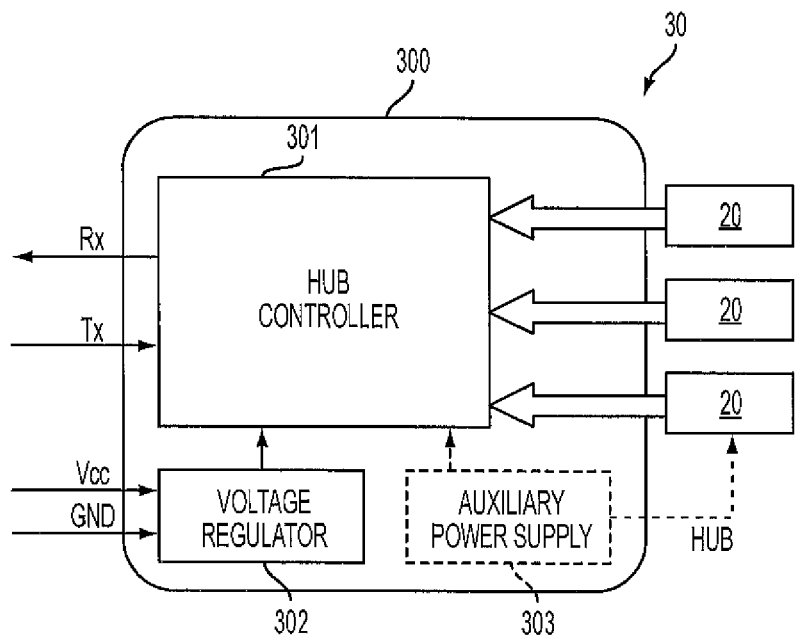

With reference to FIGS. 3A and 3B, shown are two possible configurations for the sensing modules 20 of the present invention. FIG. 3A shows the "standard" sensing module 20 as shown in FIG. 1, having a housing 200, one or more sensing probes 201, a signal conditioner 202, a voltage regulator (or power supply) 203, and a sensor controller 204. Alternatively, as shown in FIG. 3B a sensing hub 30 may be provided wherein the hub 30 itself contains no sensors, but rather is configured to engage and collect a plurality of sensing modules 20. In some embodiments, the hub 30 includes a housing 300 a hub controller 301, a voltage regulator 302, and an auxiliary power supply 303. In some cases, the voltage regulator 302 is in electrical communication with the power source 103 of user interface unit 10 (not shown in FIG. 3), such that the hub is powered by the user interface unit 10. The auxiliary power supply 303 is configured to provide power to the voltage regulators 203 of each of the individual sensing modules 20 provided for hub 30. Each of the sensing modules 20 are in electrical communication with the hub controller 301 such that data signals can be passed from the sensor modules 20 to the hub controller 30 and eventually on to the user interface unit 10 over signal wires Tx and Rx. Again, it is contemplated that the sensing modules 20 utilize their standalone signal conditioners 202 and sensor controllers 203 to convert and process signals received by the sensor probes 201 into digital and computer-readable data, which is passed to the user interface unit 10 for display, recordation, and analysis. It is appreciated that the hub 30 does not directly connect to sensors or actuators, but rather it serves as a common point into which several sensing modules 20 can connect and send data and information through a single connection point at the hub 30 to the user interface 10. Accordingly, hub 30 may be envisioned and an intermediary between a plurality of sensing modules 20 and a single user interface unit 10. Further, the hub could allow the use of two types of sensing modules 20, one sensing a particular physical or chemical property, and the other providing an actuation means for a relay, solenoid, or valve, in order to carry out a safe and efficient testing and measurement operation. It is of course appreciated, however, that the hub 30 could be omitted, and a plurality of sensing modules 20 could be in directly communication with a single user interface 30 unit, but such a configuration would require the user interface unit 10 to be increasingly complex in order to provide the necessary data and power transmission capabilities for the multitude of sensing modules 20.

Based on the foregoing, it is apparent that the present invention provides a modular system and associated method for testing and measuring various physical and chemical properties of substances. The system provides the user with the ability to place sensors in desired locations and receive sensor data on a user interface unit 10 that is either proximal or remote from the sensors. Further, the present system provides the user with a means for employing a plurality of sensing modules 20 all of which can transmit signal and sensor data to a single user interface unit 10. This allows for the capture, analysis, and testing of a plurality of substances in a plurality of locations from a single device. Furthermore, because the present invention contemplates that the sensor modules 20 include integrated signal conditioning and processing, the user interface unit 10 can be much more simplified and less expensive, as it functions primarily as a display and control device. Further still, the present invention allows the user to employ certain sensing modules 20 that include actuators such that the user can active the actuators from the (sometimes remote) user interface unit 10 without the need to physically interact with the sensing module. This functionality substantially improves safety and simplicity and is particularly useful when testing and measuring unstable, volatile, or flammable substances, such as refrigerants or other high pressure liquids or gases. To that end, it is appreciated that the sensing modules 20 of the present invention are adapted to be compatible with a wide variety of sensing probe employed for testing and measuring a variety of physical and chemical properties.

Accordingly, the instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A system for testing and measuring one or more substances, comprising:
    a user interface unit having a micro controller, a power source, a display, and an input device;
    one or more sensing modules each having at least one sensor probe, a signal conditioner, and a sensor controller comprising a computing device, wherein said sensor probe is in electrical communication with said signal conditioner and said signal conditioner is in electrical communication with said sensor controller;
    wherein said user interface unit and said sensing modules are in electrical communication such that sensor data generated by said one or more sensor probes corresponding to one or more properties of said substances is transmitted to said micro controller of said user interface unit.

2. The system of claim 1, wherein said micro controller is in electrical communication with said display and said input device.

3. The system of claim 2, wherein said sensor probe is in electrical communication with said signal conditioner and said signal conditioner is in electrical communication with said sensor controller.

4. The system of claim 3, wherein said sensor data generated by said one or more sensor probes is digitized by said signal conditioner and passed through to said sensor controller whereby said sensor controller sends said digitized sensor data to said micro controller in a computer-readable format.

5. The system of claim 4, wherein said micro controller displays said digitized sensor data on said display.

6. The system of claim 3, wherein instructions are sent from said micro controller to said sensor controller wherein said instructions are capable of manipulating said sensor probe.

7. The system of claim 1, wherein said micro controller is capable of actuating a solenoid, relay, or valve in communication with said at least one sensor probe.

8. The system of claim 1, wherein said display and said input device are coextensive, configured as a touch-screen display.

9. The system of claim 1, wherein said user interface and said one or more sensing modules are in wired electrical communication.

10. The system of claim 1, wherein said user interface and said one or more sensing modules are in wireless electrical communication.

11. A system for testing and measure one or more substances, comprising:
 a user interface unit having a micro controller, a power source, a display, and an input device;
 a hub having a hub controller, a voltage regulator, and an auxiliary power supply;
 one or more sensing modules each having at least one sensor probe, a signal conditioner, and a sensor controller comprising a computing device, wherein said sensor probe is in electrical communication with said signal conditioner and said signal conditioner is in electrical communication with said sensor controller;
 wherein said sensing modules are in electrical communication with said hub controller of said hub and said hub controller is in electrical communication with said micro controller of said user interface unit such that sensor data generated by said one or more sensor probes corresponding to one or more properties of said substances is transmitted to said micro controller of said user interface unit through said hub controller.

12. The system of claim 11, wherein said voltage regulator of said hub is in electrical communication with said power source of said user interface unit.

13. The system of claim 11, wherein said auxiliary power supply of said hub is in electrical communication with said sensing modules.

14. The system of claim 11, wherein said hub controller and said micro controller are in wired electrical communication.

15. The system of claim 11, wherein said hub controller and said micro controller are in wireless electrical communication.

16. A method for testing and measuring properties of one or more substances, comprising:
 providing a sensing module having at least one sensor probe, a signal conditioner, and a sensor controller comprising a computing device, wherein said sensor probe is in electrical communication with said signal conditioner and said signal conditioner is in electrical communication with said sensor controller;
 establishing electrical communication between said sensor controller of said sensing module and a micro controller of a user interface unit;
 generating, by said sensor probe, sensor data corresponding to one or more properties of said one or more substances;
 converting, by said signal conditioner, said sensor data into computer-readable signal data; and
 transmitting, said computer-readable signal data to said micro controller from said sensor controller.

17. The method of claim 16, further comprising the step of displaying said signal data on a display in electrical communication with said micro controller of said user interface unit.

18. The method of claim 16, further comprising the step of transmitting instructions to said sensor controller from said micro controller, wherein said instructions are capable of actuating a solenoid, relay, or valve at said sensor probe.

19. The method of claim 16, wherein said electrical communication between said sensor controller and said micro controller is wired.

20. The method of claim 16, wherein said electrical communication between said sensor controller and said micro controller is wireless.

* * * * *